United States Patent [19]
Konishi et al.

[11] Patent Number: 5,462,806
[45] Date of Patent: Oct. 31, 1995

[54] PLASTIC LENS

[75] Inventors: Toshio Konishi, Tokyo; Toshihiko Horibe, Kanagawa; Toru Yashiro, Kanagawa; Kouji Watanabe, Kanagawa; Toshiya Shuin, Kanagawa, all of Japan

[73] Assignee: Nikon Corporation, Tokyo, Japan

[21] Appl. No.: 243,830

[22] Filed: May 17, 1994

[30] Foreign Application Priority Data

May 20, 1993 [JP] Japan .................... 5-139829

[51] Int. Cl.⁶ .................... B32B 13/12
[52] U.S. Cl. .................... 428/451; 428/76; 428/204; 428/323; 428/328; 428/331; 428/404; 428/411.1; 428/447; 428/688
[58] Field of Search .................... 428/195, 411.1, 428/76, 204, 323, 328, 331, 404, 447, 451, 688; 503/227; 427/525

[56] References Cited

U.S. PATENT DOCUMENTS 4,556,605 12/1985 Mogami et al. .................... 428/331
4,800,122 1/1989 Sallavanti et al. .................... 428/412
5,165,992 11/1992 Yajima .................... 428/328

FOREIGN PATENT DOCUMENTS 0404111 12/1990 European Pat. Off. .

OTHER PUBLICATIONS

Japanese Abstract, AN 121:95627 CA; JP 06011601 A2, 940121, Itagaki et al.
Japanese Abstract, AN 116:237508 CA, JP 04004273 A2, 920108, Kimura et al.

*Primary Examiner*—Patrick J. Ryan
*Assistant Examiner*—William A. Krynski
*Attorney, Agent, or Firm*—Armstrong, Westerman, Hattori, McLeland & Naughton

[57] ABSTRACT

A plastic lens comprising a plastic lens base material having provided on at least one surface thereof (1) a primer layer comprising a resin containing at least one organosilicon compound represented by the following general formula (I):

$$R^1_m R^2_n Si(OR^3)_{4-m-n} \qquad (I)$$

wherein $R^1$ and $R^2$ each independently represents an alkyl group, an alkenyl group, an aryl group, an aralkyl group or a halogen atom, $R^3$ represents an alkyl group, an acyl group, an aryl group or an aralkyl group, and m and n are each 0 or 1, or a hydrolyzate thereof, (2) a hard coat layer and, optionally, (3) a reflection preventing layer in this order is disclosed. The plastic lens according to the present invention is characterized by having an excellent scratch resistance even though the lens has the primer layer, and also having an excellent impact resistance even though the lens has the hard coat layer.

15 Claims, No Drawings

PLASTIC LENS

FIELD OF THE INVENTION

This invention relates to a plastic lens which is excellent in adhesiveness of coated films, scratch resistance, impact resistance, resistance to chemicals, weather resistance and reflection preventing property.

BACKGROUND OF THE INVENTION

In recent years, attention has been drawn to plastic lenses as materials For eye-glasses since they have light weights as compared with inorganic glasses, are excellent in the impact resistance and are capable of being easily dyed. For these reasons, various plastic lenses having a high index of refraction and a low chromatic aberration have been proposed.

Generally, plastic lenses have a disadvantage in that they are easily scratched and, therefore, a silicone type hard coat film is usually provided on the surface of the lenses. In some cases, lenses having a reflection preventing film formed by vapor-deposition of an inorganic substance for the purpose of preventing flicker and ghost by reflection from the surface of the lens are put into practical use.

However, a plastic lens having provided thereon a hard coat layer only and a plastic lens having provided thereon both a hard coat and a reflection preventing film have also a disadvantage in that they are inferior in the impact resistance as compared with the plastic lens having no such films, and a means for solving this problem has been studied from the various viewpoints. For example, a plastic lens having a primer layer between the lens base material and the hard coat layer for the purpose of improving the impact resistance has been proposed as described in Japanese Patent Publication (Kokai) No. Sho 61-251801.

However, since the above-proposed lens has a relatively soft primer layer comprising an acryl-styrene type emulsion resin, another problem has arisen in that such a soft primer layer adversely affects the scratch resistance of the hard coat layer itself and, thus, the lens is inferior in the scratch resistance as compared with the plastic lens having no primer layer.

Accordingly, an object of the present invention is to provide a plastic lens which is excellent in the scratch resistance even though it has a primer layer, and which is excellent in the impact resistance even though it has a hard coat film or a hard coat film and a reflection preventing film.

DETAILED DESCRIPTION OF THE INVENTION

The above object of the present invention can be achieved by a plastic lens which comprises a plastic lens base material having provided on at least one surface thereof a primer layer and a hard coat layer in this order wherein said primer layer comprises a resin containing at least one organosilicon compound represented by the following general formula (I) or a hydrolyzate thereof (hereinafter referred to as compound (A)):

$$R^1_m R^2_n Si(OR^3)_{4-m-n} \quad (I)$$

wherein $R^1$ and $R^2$ each independently represents a substituted or unsubstituted alkyl group having from 1 to 20 carbon atoms, a substituted or unsubstituted alkenyl group having from 2 to 20 carbon atoms, a substituted or unsubstituted aryl group having from 6 to 19 carbon atoms, a substituted or unsubstituted aralkyl group having from 7 to 20 carbon atoms, or a halogen atom, $R^3$ represents a substituted or unsubstituted alkyl group having from 1 to 20 carbon atoms, a substituted or unsubstituted acyl group having from 2 to 20 carbon atoms, a substituted or unsubstituted aryl group having from 6 to 20 carbon atom, a substituted or unsubstituted aralkyl group having from 7 to 20 carbon atoms, and m and n are each 0 or 1.

In an embodiment of the present invention, the above-described primer layer comprises a polyurethane resin containing at least one organosilicon compound represented by the general formula (I) or a hydrolyzate thereof.

In another embodiment of the present invention, the above-described hard coat layer is formed from the organosilicon compound or the hydrolyzate thereof.

In still another embodiment of the present invention, a single or multiple layer of a reflection preventing layer is formed on the above-described hard coat layer.

In the plastic lens according to the present invention, the primer layer as an impact absorbing layer formed on at least one surface of the plastic lens base material comprises a resin containing the compound A, and, therefore, when a hard coat layer as a scratch resistant layer is laminated on the surface of the primer layer, the impact resistance of the plastic lens can be improved without adversely affecting the scratch resistance of the hard coat layer.

More specifically, the primer layer comprising a resin containing a compound A becomes a layer having appropriate hardness and elasticity together by blending a soft resin with a compound A which is hard in nature. When a hard coat layer is laminated on the primer layer, the residual stress in the inside of the lens is reduced by elasticity of the primer layer and, on the other hand, the primer layer retains appropriate hardness due to the presence of the compound A in the primer layer. Thus, satisfactory scratch resistance and impact resistance for use as plastic lens can be achieved.

The primer layer can be formed on both the back surface and the front surface or either surface of the plastic lens base material. Preferably, the primer layer is formed on the front surface since the impact resistance of the lens is controlled by an inside tensile stress generated in the boundary surface between the lens base material and the hard coat layer and, accordingly, it is desirable to reduce the internal tensile stress by inserting the primer layer. Substantially an equal degree of impact resistance can be obtained when the primer layer is provided on only the front surface or on both the front and back surfaces of the lens base material.

The amount of the compound A to be added can be varied depending upon the type of the resin used for the primer layer, but generally a preferred amount is in the range of from 5 wt % and 40 wt % and a more preferred amount is in the range of from 10 wt % to 80 wt %. When the amount of the compound A to be added is less than 5 wt %, the hardness of the primer layer is insufficient, whereas, when the amount is more than 40 wt %, the hardness becomes too high thereby lowering the impact resistance.

The resin used for the primer layer can be any type of resins as long as it satisfies the conditions such that it has sufficient adhesiveness to the plastic lens base material and the hard coat layer formed on the primer layer, and it has sufficient elasticity to absorb an impact energy.

Specific examples of the resin used for the primer layer include acrylic acid type resins, vinyl acetate and vinyl alcohol type resins, nitrogen-containing vinyl type polymer resins, amino type resins, polyester type resins, polyamide type resins, silicone type resins, polyurethane type resins, epoxy type resins, cellulose type resins as well as mixtures of these resins or copolymers thereof, and partially modified resins thereof. A compound A is added to the above described resin or resins, and the mixture is blended to obtain a main component of the material which constitutes the primer layer.

If necessary, various additives may be incorporated appropriately into the primer layer. Examples of such additives include a hardening catalyst for accelerating the curing, a leveling agent for improving the coatability, a ultraviolet ray absorbant or an antioxidant for improving the weather resistance, a coloring agent such as a pigment, a dye or a photochromic material for the purpose of coloration, and a surface active agent for obtaining a satisfactory coating film.

Further, it is possible to vary an index of refraction by incorporating a compound having an aryl group, a sulfur atom or a halogen atom into the primer layer. Examples of the aryl group and the halogen atom as referred to herein are those described for the substituents of formula (I) below. Also, the sulfur atom may be present in the molecule as mercaptan, thioether, etc. Specific examples of the compounds which can be used include xylylenediisocyanate type polyisocyanates, 3-mercaptopropionic acid, 4-mercaptomethyl-3,6-dithiate-1,8-octanediol. When these compounds are used, it is also possible to use a base material having a high index of refraction for the plastic lens according to the present invention. The index of refraction can be appropriately varied, but typically, it is adjusted to a range of from 1.49 to 1.65. Further, a sol which can be incorporated into the hard coat layer may also be added to the primer layer. Examples of the sol include a composite sol of titanium dioxide and antimony pentoxide, and a modified sol comprising tin oxide coated with a composite sol of tungsten oxide and tin oxide.

The thickness of the primer layer can be from 0.05 to 5 µm, preferably from 0.1 to 3 µm. When the film thickness is thinner than 0.05 µm, the layer does not sufficiently function as an impact absorbing layer, and, on the other hand, when the thickness exceeds 5 µm, an effect for maintaining the scratch resistance by the hard coat is reduced, and, at the same time, thermal resistance of the primer layer is deteriorated and also the surface precision of the primer layer is markedly deteriorated.

In the present invention, the hard coat as a scratch resistant layer formed on the surface of the primer layer is preferably formed from any of silicone, melamine and acryl type resins, and, among these resins, a silicone type resin is particularly preferred since a harder layer can be obtained than that obtained from melamine and aryl type resins.

The silicone resin which is particularly preferably used is the above-described compound A. The compound A used for the hard coat layer may be the same as or different from the compound used for the primer layer.

The compound A used in the primer layer and the hard coat layer is represented by the general formula (I). In the formula, the substituent which may be represented by $R^1$ and $R^2$ is each independently a straight chain or branched chain alkyl group having from 1 to 20 carbon atoms (for example, a methyl group, an ethyl group, an n-propyl group, an i-propyl group, an n-butyl group, an i-butyl group, an n-pentyl group, a hexyl group, an octyl group, a nonyl group, a decyl group, a pentadenyl group and an eicosyl group), a straight chain or branched chain alkenyl group having from 2 to 20 carbon atoms (for example, a vinyl group or an allyl group), an aryl group having from 6 to 19 carbon atoms (for example, a phenyl group, a tolyl group, a xylyl group, a biphenyl group, a naphthyl group, an anthryl group and phenanthryl group), an aralkyl group having from 7 to 20 carbon atoms (for example, a 2-phenylethyl group and a 2-phenylpropyl group), or a halogen atom (for example, a fluorine atom, a chlorine atom, a bromine atom and an iodine atom). The substituent which may be represented by $R^3$ is a straight chain or branched chain alkyl group having from 1 to 20 carbon atoms, an aryl group having from 6 to 20 carbon atoms, an aralkyl group having from 7 to 20 carbon atoms (specific examples of these substituents are the same as those described above for $R^1$ and $R^2$), or an acyl group (for example, a formyl group, an acetyl group, a propionyl group, a butyryl group, a valeryl group, an oxalyl group, a malonyl group, a succinyl group, a benzoyl group, a salicyloyl group and a naphthoyl group).

The groups represented by $R^1$, $R^2$ and $R^3$ may be substituted, and, in such a case, examples of the substituent include a hydroxy group; an amino group such as an amino group, a dibenzylamino group and a (2-methacryloxyethyl)amino group; an alkoxy group such as a methoxy group and a tert-butoxy group; an aralkoxy group such as a benzyloxy group and a phenetyloxy group; an aryloxy group such as a phenoxy group and a 2-naphthyloxy group; an acyloxy group such as an acetoxy group, benzoyloxy group and methacryloxy group; a carbamoyloxy group such as an n-phenylcarbamoyloxy group and an N-(2-methacryloxyethyl)carbamoyl group; an alkyl group such as a methyl group, a trifluoromethyl group and a glycidyl group; an aralkyl group such as a benzyl group and a phenethyl group; an aryl group such as a phenyl group and a 1-naphthyl group; a halogen atom such as a chlorine atom and a bromine atom; a cyano group; a carboxylic acid group such as a carboxylic acid group and a sodium carboxylate group; a nitro group; an acyl group such as an acetyl group and methacryl group; a carbamoyl group such as an N-methylcarbamoyl group; an alkoxycarbamoyl group such as an ethoxycarbamoyl group; a sulfonate group such as a sodium sulfonate and a sulfonate group; and a sulfamoyl group.

Examples of the organosilicon compound represented by the general formula (I) include methyl silicate, ethyl silicate, n-propyl silicate, i-propyl silicate, n-butyl silicate, sec-butyl silicate, t-butyl silicate, tetraacetoxysilane, methyltrimethoxysilane, methyltriethoxysilane, methyltrimethoxyethoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltrimethoxysilane, γ-glycidoxypropyltriphenoxysllane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltrimethoxysilane, β-(3,4- epoxycyclohexyl)ethyltriphenoxysilane, γ-(3,4-epoxycyclohexyl)propyltrimethoxysilane, γ-(3,4-epoxycyclohexyl)butyltrimethoxysilane, δ-(3,4-epoxycyclohexyl)butyltrimethoxysilane, δ-(3,4epoxycyclohexyl)butyltriethoxysilane, glycidoxymethylmethyldimethoxysilane, glycidoxymethylmetyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldimethoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, γ-glycidoxypropylphenyldimethoxysilane, γ-glycidoxypropylphenyldiethoxysilane, ethyltrimethoxysilane, ethyltriethoxysilane, vinyltrimethoxysilane, vinyltriethoxysilane, vinyitriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-metharyloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)-γ-aminopropyltrimethoxysilane, N-(β-aminoethyl)-γ-aminopropyltrimethoxysilane, N-(β-aminoethyl)-γ-aminopropylmethyldimethoxysilane, γ-aminopropyltrimethoxysilane, γ-aminopropylmethyldimethoxysilane, N-(β-aminoethyl)-γ-aminopropyltriethoxysilane, N-(β-aminoethyl)-γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-metharyloxypropylmethyldiethoxysilane, γ-mercaptopropylmethyldimethoxysilane, γ-mercaptopropylmethyldiethoxysilane, methylvinyldimethoxysilane and methylvinyldiethoxysilane.

These organosilicon compounds can be used alone or as a combination of two or more compounds.

The organosilicon compound or the hydrolyzate thereof added to the above-described hard coat layer or the primer layer may contain, without any problems, fine particles of inorganic materials which are generally used for the purpose of improvement of surface hardness. The fine particles of the inorganic materials used herein are preferably those having an average particle diameter of from about 1 to 300 nm, more preferably from about 5 to 200 nm.

Specific examples of the fine particles of inorganic materials include silicon oxide compounds such as silicon dioxide, aluminum oxide compounds such as aluminum trioxide, titanium oxide compounds such as titanium dioxide, zirconium oxide compounds such as zirconium dioxide, tin oxide compounds such as tin dioxide, antimony oxide compounds such as antimony trioxide and antimony pentoxide, a complex sol of titanium dioxide and antimony pentoxide, a modified sol wherein tin oxide is coated with a complex sol of tungsten oxide and tin oxide.

The hard coat layer according to the present invention may contain, without any problems, various hardening agents which make it possible to accelerate the hardening of the hard coat layer and to harden the hard coat layer at low temperatures. Examples of known hardening agents which can be used include various epoxy resin hardening agents, and various organosilicon resin hardening agents.

Specific examples of hardening agents include various organic acids and acid anhydrides thereof, nitrogen-containing organic compounds, various metal complex compounds or metal alkoxides, and various salts such as alkali metal organic carboxylates or carbonates.

Also, in the present invention, a single or multiple layer of reflection preventing film can be formed on the surface of the hard coat layer. In such a case, the reflection preventing film can be formed with a coating film of, for example, a metal, a metal or semimetal oxide or fluoride, and specific examples thereof include a coating film of metal oxides such as $SiO_2$ and $ZrO_2$, and metal fluorides such as $MgF_2$.

The resin materials for the plastic lens base material used in the present invention are not limited, but a resin material produced from a starting liquid hardenable compound having at least one of a benzene ring, a naphthalene ring, a carbonate bond, a urethane bond and a halogen atom in the main chain and/or the side chain thereof is particularly preferred.

Particularly preferred resin materials for the plastic lens base material used in the present invention include polymethyl methacrylate and a polymer thereof, polycarbonate, diethylene glycol bisacrylcarbonate polymer (CR-39), a polyester (in particular, polyethylene terephthalate and a unsaturated polyester), an epoxy resin, a polyethersulfone, etc.

In particular, a resin material containing a component comprising a cyclic trimer of hexamethylene diisocyanate represented by the following formula (II), a component comprising a diol compound represented by the following formula (III), a component comprising a compound represented by the following formula (IV), and a component comprising a radical polymerization reactive compound having a divinylbenzene and an aromatic ring is more preferred, and when this resin material is used as a component of the present invention, excellent results can be obtained:

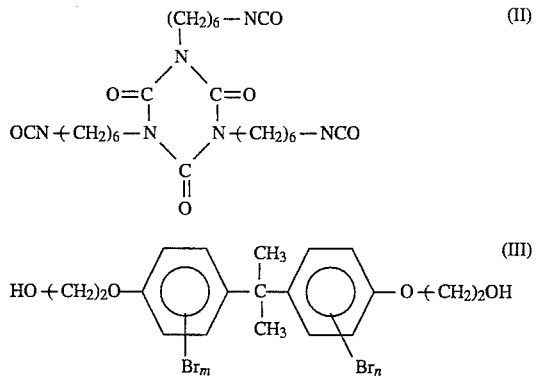

(wherein m and n each represents an integer of from 0 to 2)

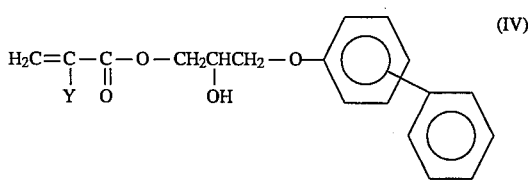

(wherein Y represents a hydrogen atom or a methyl group).

The plastic lens base material used in the present invention can be formed in a similar manner to a method for forming a usual plastic lens by polymerization. For example, a molded plastic lens base material can be obtained by pouring a monomer mixture into a die composed of a glass mold and a gasket made by an ethylene-vinyl acetate copolymer, curing the monomer mixture at a predetermined temperature for a predetermined period of time, and, if necessary, postcuring the molded material outside the die. However, it should be understood that plastic lens base materials formed by other methods can also be used as well in the present invention.

In producing the plastic lens of the present invention, at least one surface of the plastic lens base material is coated with a primer coating material comprising a resin having added thereto a compound A for forming a primer layer which functions as an impact absorbing layer, and the coated base is then subjected to a curing treatment.

The above-described primer coating material comprises a mixture of a resin to which a compound A has been added and a solvent. As the solvent for diluting the resin to which a compound A has been added, alcohols, ketones, esters and ethers as well as other known solvents can be used. A particularly preferred solvent is methanol, ethyl cellosolve or methyl ethyl ketone, but these solvents can be used alone or as a mixed solvent comprising two or more different solvents.

Methods for coating the primer coating material are not limited, and can be conventional methods such as a spin-coating method, a dipping method, a spray method or the like. If necessary, it is desirable to subject the plastic lens base material to a pretreatment such as an alkali treatment, a plasma treatment and a ultraviolet ray treatment prior to the coating in order to improve the coatability of the primer layer.

After coating the primer coating material, the resulting primer layer is solidified or cured by a curing method which is considered most suitable to the primer coating material used, for example, by allowing it to stand or by conducting heat-curing, photo-curing or electron beam curing, whereby a uniform coating film can be formed.

Then, a hard coat layer as a scratch resistant layer is provided on the surface of the primer layer. A hard coat agent used for the hard coat layer is preferably a resin selected from silicone, melamine and acryl resins diluted with a solvent. Examples of the solvent are those described for the primer coating material.

Similar to the primer layer, the hard coat layer can be formed by a conventional coating method such as a spin-coating method, a dipping method, a spray method or the like. After applying the hard coat agent, the coated layer is subjected to a curing treatment which is considered most suitable to the hard coat agent used, for example, by heat-curing, ultraviolet ray curing, electron beam curing or the like.

Also, when a single or multiple layer of the reflection preventing film is provided on the surface of the hard coat layer, a metal, or an oxide or fluoride of a metal or semi-metal, for example, a metal oxide such as $SiO_2$ and $ZrO_2$ or $MgF_2$ can be deposited by a conventional method such as a vapor-deposition method, a sputtering method, an ion plating method, an ion beam assist method or the like.

The present invention is illustrated in more detail by the following examples, but the present invention is not limited thereto.

EXAMPLE 1

(1) Plastic Lens Base Material

A plastic lens base material for eye-glasses, CR-39 (a trademark of PPG Co., Ltd. for a diethylene glycol bisallylcarbonate resin; a diameter of 75 mm, a degree of 3.00 D, a center thickness of 1.4 mm) was used.

(2) Preparation of Primer Composition, and Coating and Curing

A mixture comprising the following composition was thoroughly stirred until it became a uniform state to prepare a primer composition:

| | |
|---|---|
| Main Component for Urethane Coating Material (Urethane Clear #2026, produced by Kansai Paint Co., Ltd.) | 100 g |
| Urethane hardening agent (produced by Kansai Paint Co., Ltd.) | 33 g |
| γ-Glycidoxypropyltrimethoxysilane | 25 g |
| Surface active agent (DC11 PA, a trademark of Toray Silicone Co., Ltd.) | 0.05 ml |
| Ethyl cellosolve | 200 g |

The resulting primer composition was applied on the front surface ($R^2$ surface side) of a plastic lens base material (1) above which had been subjected to a plasma treatment as a pretreatment by a spin-coating method (a rotation rate, 1,000 r.p.m., 5 sec.), and then the primer layer was cured by heat treatment at 80° C. for 30 minutes to form a primer layer of 1.2 μm thickness on the lens base material.

(3) Preparation of Hard Coat Agent (A) Preparation of Preparatory Composition A 248 parts by weight of γ-glycidoxypropylmethyldiethoxysilane was placed in a reaction vessel provided with a rotator, and 36 parts by weight of a 0.05N aqueous hydrochloric acid solution was added thereto all at once while vigorously stirring with a magnetic stirrer, and the mixture was stirred for 1 hour to obtain a hydrolyzate.

After adding 56.6 parts by weight of ethanol and 53.4 parts by weight of ethylene glycol to the resulting hydrolyzate, 4.7 parts by weight of aluminum acetyl acetate was added thereto, and the mixture was well mixed and dissolved to prepare a preparatory composition A.

(B) Preparation of Preparatory Composition B 212.5 parts by weight of γ-glycidoxypropyltrimethoxysilane was placed in a reaction vessel provided with a rotator and the inside temperature of the vessel was maintained at 10° C. Then, 48.6 parts by weight of a 0.01N aqueous hydrochloric acid solution was gradually added dropwise thereto while vigorously stirring with a magnetic stirrer. After completion of the addition, cooling was immediately stopped to obtain a liquid hydrolyzate.

To the resulting hydrolyzate were added 77.1 parts by weight of ethanol and 37.7 parts by weight of ethylene glycol, and thereafter 7.65 parts by weight of aluminum acetyl acetate was added thereto, and the mixture was thoroughly mixed to prepare a preparatory composition B.

(C) Preparation of Hard Coat Agent

In a glass vessel, 20 parts by weight of the above-described preparatory composition A, 80 parts by weight of the above-described preparatory composition B, 200 parts by weight of a commercially available methanol silica gel (produced by Nissan Chemical Industries Co., an average particle size, 10 to 20 nm), and 0.45 parts by weight of a silicone type surface active agent were thoroughly mixed with stirring to prepare a liquid hard coat agent.

(4) Coating and Curing of Hard Coat Agent

The plastic lens base material having a primer layer obtained in (2) above was subjected to an immersion treatment in a 10% aqueous sodium hydroxide solution at 60° C. for 3 minutes for the purpose of improving adhesion, and then the treated base material was washed with water and dried.

The above-described plastic lens base material having the primer layers which had been subjected to the immersion treatment as described above was coated with on the primer layers of both the front surface ($R^2$ surface) and the back surface ($R^1$ surface) by a dipping method (at a lifting rate of 90 mm/min). Then, the coated material was heat-treated at 100° C. for 4 hours to harden the hard coat layer. The film thickness of the hard coat layer thus obtained was 2.2 μm.

(5) Formation of Reflection Preventing Film Five layers of a reflection preventing film of $SiO_2/ZrO_2$ were formed by a vacuum deposition method on both the front and back surfaces of the plastic lens having the primer layer and the hard coat layer formed in (4) above.

The plastic lens having a composite film obtained as described above was found to have excellent film adhesion, scratch resistance and impact resistance as apparent from the test results shown in Table 1 below.

EXAMPLE 2

The primer composition of Example 1 was applied on both the front and back surfaces of the plastic lens base material by a dipping method (a lifting rate, 60 mm/min). The film thickness of the resulting primer layer was 2.7 μm.

Then, according to the procedure as described in Example 1, a plastic lens having a composite film was prepared and tested in the same manner as described in Example 1. The test results obtained are shown in Table 1 below.

EXAMPLE 3

12.4 g of pure water was added to 50 g of γ-glycidoxypropyltrimethoxysilane, and the mixture was stirred until it became a uniform state, followed by allowing to stand for one day in a dark place to prepare a hydrolyzate. A plastic lens having a composite film was prepared in the same manner as described in Example 1 except for forming a primer layer from the primer composition which contains the above-prepared hydrolyzate in place of γ-glycidoxypropyltrimethoxysilane used in Example 1. The resulting lens was then tested in the same manner as in Example 1, and the test results obtained are shown in Table 1 below.

EXAMPLE 4

In a first step, 9.71 parts by weight of 1-methacryloxy-3-(phenylphenoxy)-2-propanol (purity, 99.2% by weight), 8.41 parts by weight of a cyclic trimer of hexamethylenediisocyanate (content of isocyanate group, 23.1% by weight; effective molecular weight based on the purity of the isocyanate group, 545) and 4.88 parts by weight of 2,2-bis[3,5-dibromo-4-(2-hydroxyethoxy)phenyl]propane were mixed.

To the resulting mixture was added dibutyltin laurate as a catalyst for urethane formation reaction in an amount of 0.01% by weight, and the urethane formation reaction was conducted at 60° C. for 2 hours to obtain a product.

In a second step, 17.0 parts by weight of 1-methacryloxy-3-(2-phenylphenoxy)-2-propanol (purity, 99.2% by weight) was added to the product obtained in the first step, and the mixture was mixed.

To the resulting mixture was added lauryl peroxide as a radical polymerization catalyst in an amount of 1.0% by weight based on the weight of the mixture. The resulting mixture was poured into a glass mold and subjected to a radical copolymerization reaction while changing the reaction conditions stepwise, i.e., at 40° C. for 10 hours, at 60° C. for 4 hours, at 80° C. for 2 hours, and finally 90° C. for 1 hour to obtain a colorless transparent plastic lens base material having a center thickness of 1.2 mm, a degree of 3.00 D and a diameter of 72 mm.

A plastic lens having a composite film was prepared in the same manner as described in Example 2 but using the above-prepared plastic lens base material, and resulting lens was tested in the same manner as in Example 1. The test results obtained are shown in Table 1.

EXAMPLES 5 to 7

Plastic lenses having a composite film were prepared in the same manner as described in Example 1 except for using the urethane type plastic lens for eye-glasses prepared by the procedure as described in Example 4 as a plastic lens base material (a diameter of 80 mm; a degree of 3.00 D; a center thickness of 1.0 mm), and each of the primer compositions and each of the hard coat agents described below. In each case, the primer composition was used after it was thoroughly stirred to a uniform state.

| Primer Composition used in Example 5: | |
|---|---|
| Xylenediisocyanate Type Polyisocyanate (Takenate D-110N, a trademark of Takeda Chemical Industries, Co.) | 90.0 g |
| Polycarbonate type polyol (Nipporan 983, a trademark of Nippon Polyurethane Industries Co.) | 50.0 g |
| Pentaerythritol tetrakis (3-mercaptopropionic acid) | 40.0 g |
| γ-Glycidoxypropyltrimethoxysilane | 22.5 g |
| Zinc octanoate | 2.0 g |
| Surface active agent (Florade FC-431, a trademark of Sumitomo 3M) | 0.1 g |
| Ethyl acetate | 400.0 g |
| Methyl ethyl ketone | 200.0 g |
| Primer Composition used in Example 6: | |
| Xylenediisocyanate Type Polyisocyanate (Takenate D-110N, a trademark of Takeda Chemical Industries, Co.) | 100.0 g |
| Polycarbonate type polyol (Nipporan 983, a trademark of Nippon Polyurethane Industries Co.) | 140.0 g |
| γ-Glycidoxypropyltrimethoxysilane | 25.0 g |
| Zinc octanoate | 2.0 g |
| Surface active agent (Florade FC-431, a trademark of Sumitomo 3M) | 0.1 g |
| Ethyl acetate | 600.0 g |
| Primer Composition used in Example 7: | |
| Xylenediisocyanate Type Polyisocyanate (Takenate-500, a trademark of Takeda Chemical Industries, Co.) | 110.0 g |
| Polyester type polyol (Nipporan 2200, a trademark of Nippon Polyurethane Industries Co.) | 40.0 g |
| γ-Glycidoxypropyltrimethoxysilane | 27.5 g |

-continued

| | |
|---|---|
| 4-Mercaptomethyl-3,6-dithiate-1,8-octanediol | 90.0 g |
| Zinc octanoate | 1.0 g |
| Surface active agent (Florade FC-431, a trademark of Sumitomo 3M) | 0.1 g |
| Methyl ethyl ketone | 500.0 g |
| Ethyl cellosolve | 500.0 g |

Hard Coat Agent used in Examples 5 to 7

675 parts by weight of isopropyl alcohol and 105 parts by weight of bis(trimethoxysilyl)ethane were placed in a glass flask containing a stirrer, and 50 parts by weight of 0.05N hydrochloric acid was added dropwise thereto with stirring. After further continuing the stirring, the mixture was aged for one day. Then, 100 parts by weight of an aqueous dispersed antimony pentoxide sol (a solid concentration, 30%, an average particle diameter, 10 nm), 70 parts by weight of silica sol (a solid concentration, 30%, an average particle diameter, 10 nm, an aqueous sol) and 0.2 part by weight of a silicone type surface active agent were added thereto, and the mixture was thoroughly stirred and thereafter filtered to obtain a hard coat agent.

The thickness of the primer layers in Examples 5 to 7 were 1.2 μm, 1.2 μm, and 1.4 μm, respectively, and the indexes of refraction thereof were 1.59, 1.56 and 1.61, respectively. Also, the thickness of the hard coat layers in Examples 5 to 7 were all 2.3 μm, and the indexes of refraction thereof were all 1.60.

The resulting plastic lenses were tested in the same manner as described in Example 1, and the test results are shown in Table 1 below.

Comparative Example 1

A plastic lens having a composite film was prepared in the same manner as described in Example 1 except that no primer layer was provided. The resulting lens was tested in the same manner as in Example 1, and the test results are shown in Table 1 below.

Comparative Example 2

A primer composition containing no γ-glycidoxypropyl-trimethoxysilane was applied as a primer layer to both surfaces of the plastic lens base material (at a rotation rate of 1,000, 5 sec). The film thickness of the primer layer thus obtained was 1.4 μm.

A plastic lens having a composite film was prepared in the same manner as described in Example 1 except for using the above-prepared plastic lens base material, and the resulting lens was tested in the same manner as in Example 1. The test results obtained are shown in Table 1 below.

Comparative Example 3

A plastic lens having a composite film was prepared in the same manner as described in Comparative Example 1 except for using the plastic lens base material used in Example 4, and the resulting lens was tested in the same manner as in Example 1. The test results obtained are shown in Table 1 below.

The evaluation of the performance of plastic lenses prepared in each of Examples and Comparative Examples was performed by the following test method.

1) Adhesiveness of Film

A cross-hatch tape test For evaluating adhesiveness of the film was conducted as follows. That is, the surface of the lens having the film was cross-hatched by means of a cutter in a size of 1 mm square (100 squares), and an adhesive tape was adhered to the cross-hatched surface. Then, the adhesive tape was peeled off quickly, and this procedure was repeated in 10 times. Finally, a number of cross-hatched films which were not peeled off and retained on the lens (which is referred to as a number of X) was counted, and the result was indicated in terms of X/100. The result shown as "100/100" indicates that none of the cross-hatched Films was peeled off in the cross-hatch test.

2) Scratch Resistance

The surface of the lens was rubbed with Steel Wool No. 1000 (a trademark of Nippon Steel Wool Co., Ltd.) and the resistance to the scratching was determined. The rating of the results are as follows:

A: no scratch with strong rubbing

B: slight scratch with strong rubbing

C: scratch even with weak rubbing

3) Impact Resistance

The impact resistance was evaluated by a steel ball falling test. A steel ball having a weight of 16.2 g was naturally fallen down from a height of 127 cm toward the center portion of the lens, and the impact resistance was expressed in terms of a number of the falling down test procedures where the lens withstood breaking. The maximum number of the test procedures performed was 6 times.

TABLE 1

| | | Adhesiveness | | Scratch Resistance | | | |
|---|---|---|---|---|---|---|---|
| | | Back Surface | Front Surface | Back Surface | Front Surface | Impact Resistance | Total Evaluation |
| Ex. | 1 | 100/100 | 100/100 | A | A | 6 or more times | Good |
| | 2 | 100/100 | 100/100 | A | A | 6 or more times | Good |
| | 3 | 90/100 | 90/100 | A | A | 4 times | Good |
| | 4 | 100/100 | 100/100 | A | A | 4 times | Good |
| | 5 | 100/100 | 100/100 | A | A | 4 times | Good |
| | 6 | 100/100 | 100/100 | A | A | 4 times | Good |
| | 7 | 100/100 | 100/100 | A | A | 4 times | Good |

TABLE 1-continued

|  | Adhesiveness | | Scratch Resistance | | Impact Resistance | Total Evaluation |
| --- | --- | --- | --- | --- | --- | --- |
|  | Back Surface | Front Surface | Back Surface | Front Surface | | |
| Comp. 1 | 100/100 | 100/100 | A | A | 0 times | Poor |
| Ex. 2 | 100/100 | 100/100 | B | B | 4 times | Poor |
| 3 | 100/100 | 80/100 | B | B | 3 times | Poor |

What is claimed is:

1. A plastic lens comprising a plastic lens base material having a primer layer on at least one surface thereof and a hard coat layer on the primer layer, said primer layer having a thickness from 0.05 μm to 5 μm comprising a resin containing 5 to 40 wt % of at least one organosilicon compound represented by the following general formula (I) or a hydrolyzate thereof:

$$R^1_m R^2_n Si(OR^3)_{4-m-n} \qquad (I)$$

wherein $R^1$ and $R^2$ each independently represents an alkyl group having from 1 to 20 carbon atoms, an alkenyl group having from 2 to 20 carbon atoms, an aryl group having from 6 to 19 carbon atoms, an aralkyl group having from 7 to 20 carbon atoms, or a halogen atom; $R^3$ represents an alkyl group having from 1 to 20 carbon atoms, an acyl group having from 2 to 20 carbon atoms, an aryl group having from 6 to 20 carbon atom, an aralkyl group having from 7 to 20 carbon atoms, wherein said alkyl, alkenyl, aryl, aralkyl and acyl groups may be substituted by a hydroxy, amino, alkoxy, aralkoxy, aryloxy, acyloxy, carbamoyloxy, alkyl, trifluoromethyl, glycidyl, aralkyl, aryl, halogen, cyano, carboxylic acid, nitro, acyl, carbamoyl, alkoxycarbamoyl, sulfanate or sulfamoyl group; and m and n are each 0 to 1.

2. A plastic lens as claimed in claim 1, wherein said primer layer comprises a polyurethane resin containing an organosilicon compound represented by the general formula (I) above or a hydrolyzate thereof.

3. A plastic lens as claimed in claim 1, wherein said hard coat layer is composed of an organosilicon compound represented by the general formula (I) above or a hydrolyzate thereof.

4. A plastic lens as claimed in claim 3, wherein a single or multiple layer of a reflection preventing layer is formed on the surface of said hard coat layer.

5. A plastic lens as claimed in claim 1, wherein said primer layer contains a compound having an aryl group, a sulfur atom or a halogen atom for changing an index of refraction.

6. A plastic lens as claimed in claim 5, wherein said index of refraction is in the range of from 1.49 to 1.65.

7. A plastic lens as claimed in claim 1, wherein said plastic lens base is composed of a material having an index of refraction in the range of 1.49–1.65.

8. A plastic lens as claimed in claim 1, wherein at least one of said hard coat layer and said primer layer contain inorganic fine particles.

9. A plastic lens as claimed in claim 8, wherein said inorganic fine particles are made of at least one member selected from the group consisting of silicon oxide, aluminum oxide, titanium oxide, zirconium oxide, tin oxide, antimony oxide, a complex sol of titanium dioxide and antimony pentoxide and a modified sol in which tin oxide is coated with a complex sol of tungsten oxide and tin oxide.

10. A plastic lens as claimed in claim 8, wherein said inorganic fine particles have an average particle diameter of 1–300 nm.

11. A plastic lens as claimed in claim 1, wherein said primer layer comprises at least one soft resin selected from the group consisting of acryl resins, vinyl acetate and vinyl alcohol resins, nitrogen-containing vinyl polymer resins, amino resins, polyester resins, polyamide resins, silicone resins, polyurethane resins, epoxy resins and cellulose resins.

12. A plastic lens as claimed in claim 1, wherein said primer layer contains at least one additive selected from the group consisting of a hardening catalyst for accelerated cure, a leveling agent for improved coatability, an ultraviolet ray absorber for improved weather resistance and a surface active agent.

13. A plastic lens as claimed in claim 1, wherein said hard layer is composed of at least one resin selected from the group consisting of silicone resins, melamine resins and acryl resins.

14. A plastic lens as claimed in claim 1, wherein said hard layer contains a hardening agent.

15. A plastic lens as claimed in claim 14, wherein said hardening agent is an epoxy resin hardening agent or an organosilicone resin hardening agent.

* * * * *